(12) United States Patent
Hajjar et al.

(10) Patent No.: US 6,787,745 B2
(45) Date of Patent: Sep. 7, 2004

(54) FIBER OPTIC SIGNAL DETECTOR WITH TWO SWITCHABLE INPUT CHANNELS

(75) Inventors: Roger A. Hajjar, San Jose, CA (US); Frank Whitehead, Orangevale, CA (US)

(73) Assignee: Avanex Corporation, Fremont, CA (US)

( * ) Notice: Subject to any disclaimer, the term of this patent is extended or adjusted under 35 U.S.C. 154(b) by 103 days.

(21) Appl. No.: 10/042,947

(22) Filed: Jan. 8, 2002

(65) Prior Publication Data

US 2002/0113200 A1 Aug. 22, 2002

Related U.S. Application Data

(60) Provisional application No. 60/260,402, filed on Jan. 9, 2001.

(51) Int. Cl.[7] .................................................. G01J 1/20
(52) U.S. Cl. ...................... 250/201.1; 385/16; 385/18; 370/216; 398/17; 250/234
(58) Field of Search .............................. 398/17, 19, 20; 250/216, 230, 234, 227.11; 359/290, 291; 385/16, 18

(56) References Cited

U.S. PATENT DOCUMENTS

| | | | |
|---|---|---|---|
| 4,261,638 A | 4/1981 | Wagner | 385/25 |
| 5,208,880 A | 5/1993 | Riza et al. | 385/18 |
| 5,481,631 A | 1/1996 | Cahill et al. | 385/18 |
| 5,559,622 A | 9/1996 | Huber et al. | 359/110 |
| 6,411,751 B1 | 6/2002 | Giles et al. | 385/16 |

*Primary Examiner*—Thanh X. Luu
(74) *Attorney, Agent, or Firm*—Moser, Patterson & Sheridan, L.L.P.

(57) ABSTRACT

Switchable two-fiber systems to provide a backup fiber link to a signal detector where the backup signal is switched to the signal detector when the primary signal fails.

20 Claims, 4 Drawing Sheets

FIBER OPTIC SIGNAL DETECTOR WITH TWO SWITCHABLE INPUT CHANNELS

This application claims the benefit of U.S. Provisional Application No. 60/260,402 entitled "Fiber Optic Signal Detector with Switchable Two Channel Input" and filed Jan. 9, 2001, the disclosure of which is incorporated herein by reference.

BACKGROUND

This application relates to optical fiber links and optical fiber communications.

In optical fiber systems, a particular fiber link between two points such as devices or nodes may unexpectedly fail. Such a link failure may cause an interruption or halt in communications between the two points. To reduce such interruption of communications, it may be desirable to provide some redundancy in linking the two points. For example, two fibers may be used to independently connect two points in a fiber system, where one fiber is used as the primary link and the other fiber is used as the backup or secondary link to replace the primary fiber when the primary fiber fails.

SUMMARY

This application describes switchable two-fiber systems for a fiber link terminated at a signal detector. An optical switching mechanism is used to optically connect the primary fiber and the backup fiber to the common signal detector. The switching mechanism can be controlled to switch the output signal from either fiber into the signal detector. In one embodiment, the switching mechanism includes an actuator-controlled rotating mirror. In another embodiment, an actuator-controlled sliding mirror may be used to switch one of the output signals from the two input fibers into the common signal detector.

DETAILED DESCRIPTION

The switchable two-fiber systems of this application provide redundancy in the optical communication link to an optical receiver such as a signal detector. A single set of optical switching mechanism, the control electronics, and the optical receiver may be used to implement the redundancy. In general, the output optical signals from the primary and the backup fibers may be collimated before being directed to the switching mechanism and the signal detector. This optical collimation may be achieved by either using separate fiber collimators for the two fibers respectively, or sharing a common fiber collimator lens with the two fibers.

Figure 1:
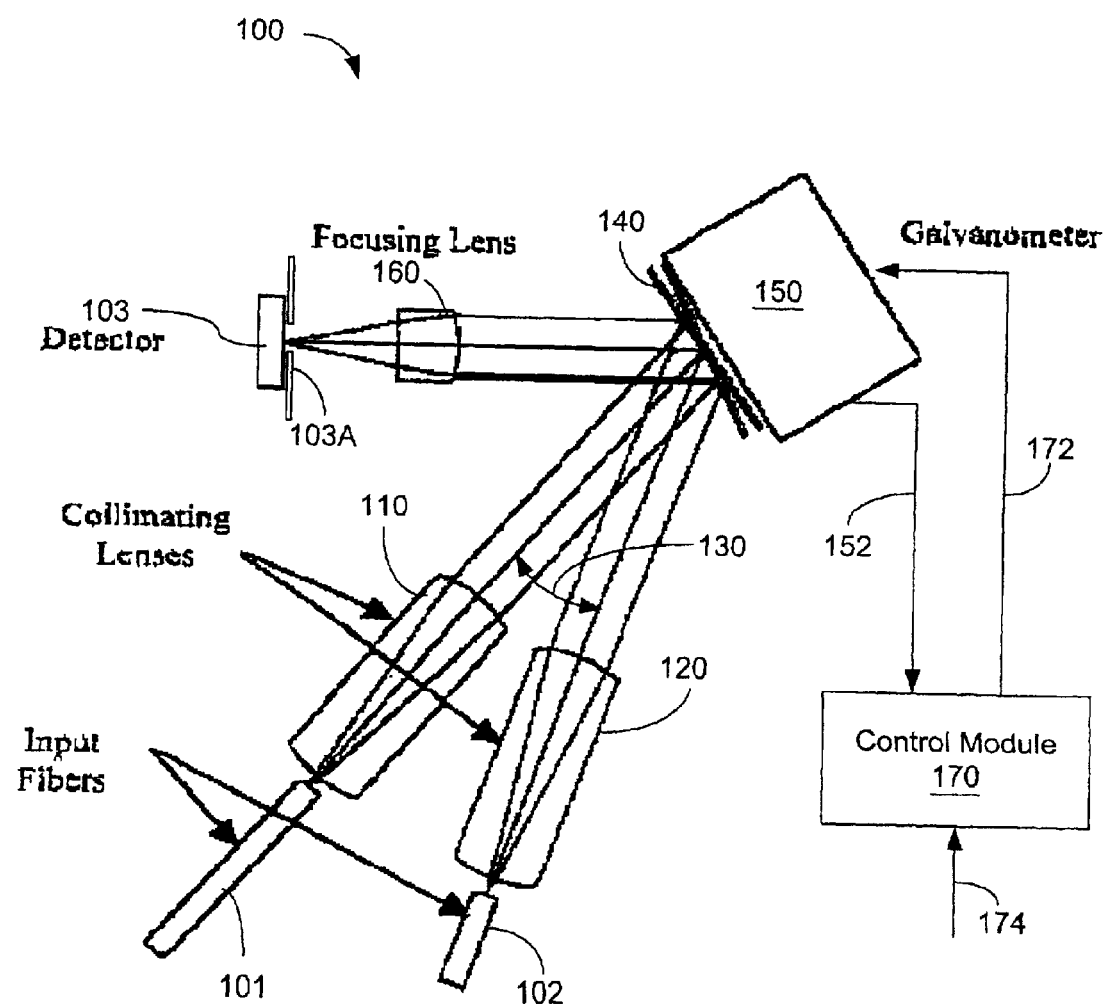
FIGS. 1 and 2 illustrate two exemplary embodiments of switchable two-fiber systems for a fiber link terminated at a signal detector based on a controllable rotating reflector switch.

FIG. 1 shows one embodiment 100 of a switchable two-fiber system for a fiber link terminated at a signal detector 103. The fiber link includes two linking fibers 101 and 102, one being the primary fiber and the other being the backup fiber, to respectively carry first and second optical signals that are modulated to carry the same information or data. A first fiber collimator lens 110 is placed in the optical path of the first optical signal from the fiber 101 to collimate the first output signal. A second fiber collimator lens 120 is placed in the optical path of the second optical signal from the second fiber 102 to collimate the second output signal. Each collimator fiber lens may be a single lens or a combination lens. In this embodiment, the two fibers 101 and 102 are oriented toward each other to form an angle 130 so that the first and second collimated optical signals spatially intercept. A common optical reflector 140 is positioned to receive both first and second collimated optical signals from the two fibers 101 and 102, respectively. In one implementation, the reflective surface of the reflector 140 may be positioned at or near the location where the two collimated signals intercept.

The reflector 140 is a rotatable reflector which is engaged to and is controlled by a rotational actuator assembly 150. The rotational movement of the reflector 140 changes the direction of the reflected light of each of two received collimated signals from the fibers 101 and 102. As described below, this operation of the reflector 140 can be used to switch only one collimated signal beam from one fiber into the signal detector at a time while rejecting another collimated signal from the other fiber.

A backup control module 170 is coupled to control the operation of the actuator assembly 150 via a control signal 172. The backup control module 170 receives an input signal 174 which indicates whether this is a failure in the primary fiber which may be either 101 or 102. When the signal 174 indicates a failure in the primary fiber, the control signal 172 controls the actuator assembly 150 to change the orientation of the reflector 140 to switch the signal from the backup fiber into the signal detector 103. Because both fibers 101 and 102 carry the same information or data on their respective beams, the failure of the primary fiber does not interrupt the communication link to the signal detector 103.

The two-fiber system 100 also includes a common focusing lens 160 in the optical path between the reflector 140 and the signal detector 103 to focus the collimated beams from the fibers 101 and 102 on or near the plane of the detector surface of the signal detector 103. Because the two collimated beams are reflected by a common reflector 140 and propagate at the angle 130 with respect to each other, the focused spots of the two beams are spatially separated from each other. If the angle 130 is sufficiently large, the spatial separation between the two focused beam spots at the plane of the detector surface may be sufficiently large to allow only one focused beam to be received by the detector 103. This may be achieved by using a detector with a detector surface that is sufficiently small. Alternatively as illustrated, a detector aperture 103A may be placed on or close to the detector surface to select only one focused spot to be received by the detector 103 while blocking the other focused spot. The reflector 140 thus can have two preset rotational positions to respectively place the two signals from the fibers 101 and 102 into the detector 103. Accordingly, accurate control of the rotational positions of the reflector 140 is desirable to ensure proper switching between the two fibers 101 and 102. The angular range for rotation may be approximately from −5 degree to +5 degree with an accuracy of about 1 milliradian. An active control mechanism in the actuator assembly 150 for achieve such accurate control is described later in this application.

Figure 2:
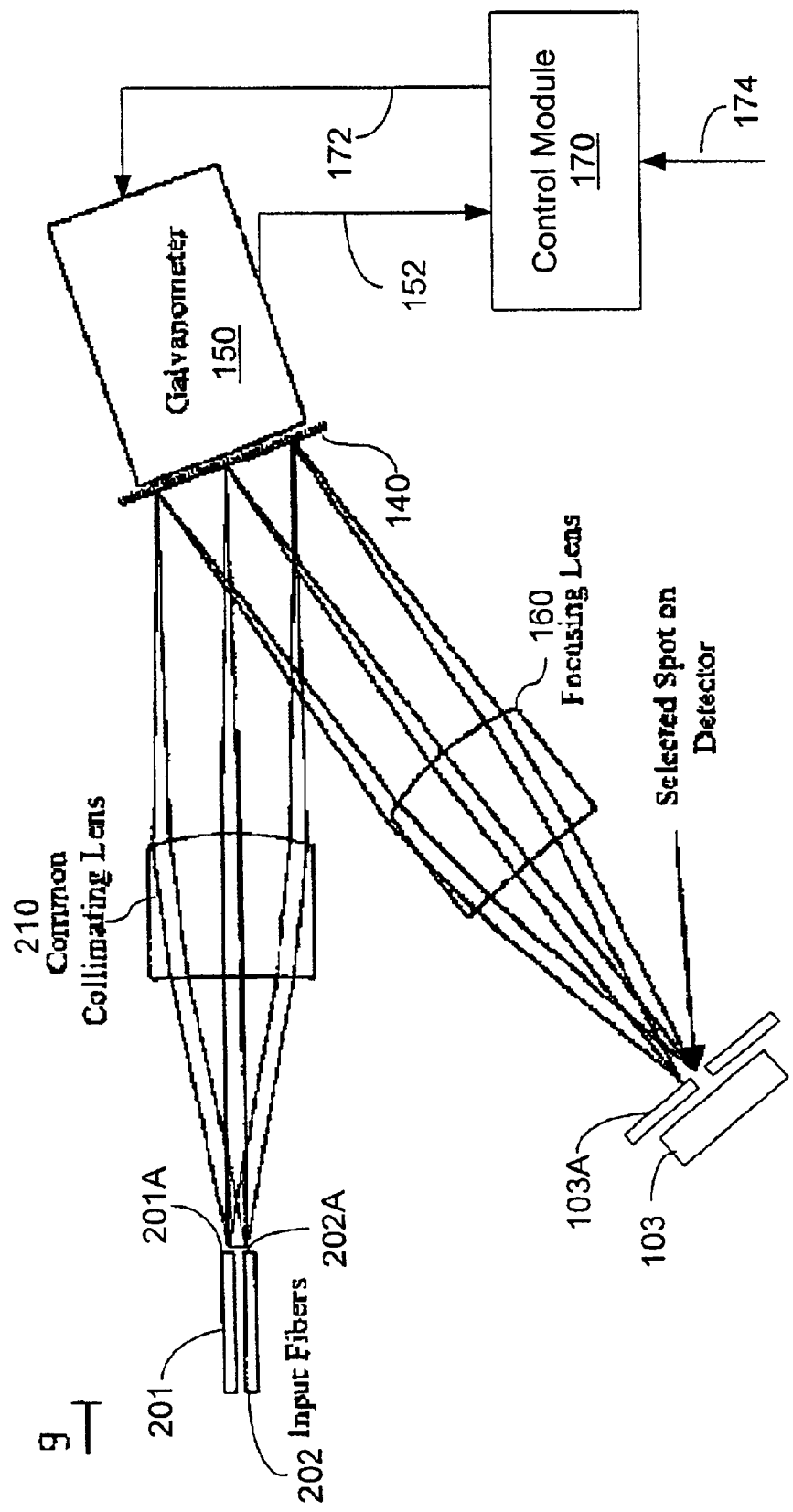

FIG. 2 shows a system 200 different from the system 100 in that a common collimating lens 210 replaces the separate collimators 110 and 120 in FIG. 1. Two linking fibers 201 and 202 are arranged to place their end facets 201A and 202A, respectively, near or at the focal plane of the common collimating lens 210 so that the lens 210 can collimate signals output from both fibers 201 and 202. The two fibers 201 and 202 may be substantially parallel to each other with a spacing between the fibers as illustrated or may be arranged to form an angle toward each other. For example, the two fibers 201 and 202 may be parallel to each other with a lateral separation of about 160 microns. The focusing lens 160 may be designed to image the output facets of the two fibers 201 and 202 on the detector surface with approximately the same lateral separation. A detector with a detector surface dimension or an aperture 103A of about 20 microns may be used to ensure that only one focused beam is received while the other is blocked.

In both systems 100 and 200, the rotational actuator assembly 150 may include any suitable actuators with the needed rotational control accuracy. Various rotational actuators may be used for this purpose, including but not limited to, electromagnetic actuators, piezo-electric actuators, and electrostatic actuators. A galvanometer with one or two rotational axes, for example, is one implementation of the electromagnetic actuators. Micro electrical mechanical system (MEMS) actuators fabricated on semiconductor substrates may be formed by using either the electrostatic mechanism or the electromagnetic mechanism to cause the rotation. Such a rotational actuator generally produces a force or torque to move the reflector 140 when energy applied thereto is turned on or changed. A typical galvanometer, for example, has an electromagnetic assembly in which a coil carrying an electric current is placed inside a magnetic field to rotate around a rotational axis. The electromagnetic interaction between the magnetic field and the current produces a torque to cause the rotation of the coil.

Figure 3A:
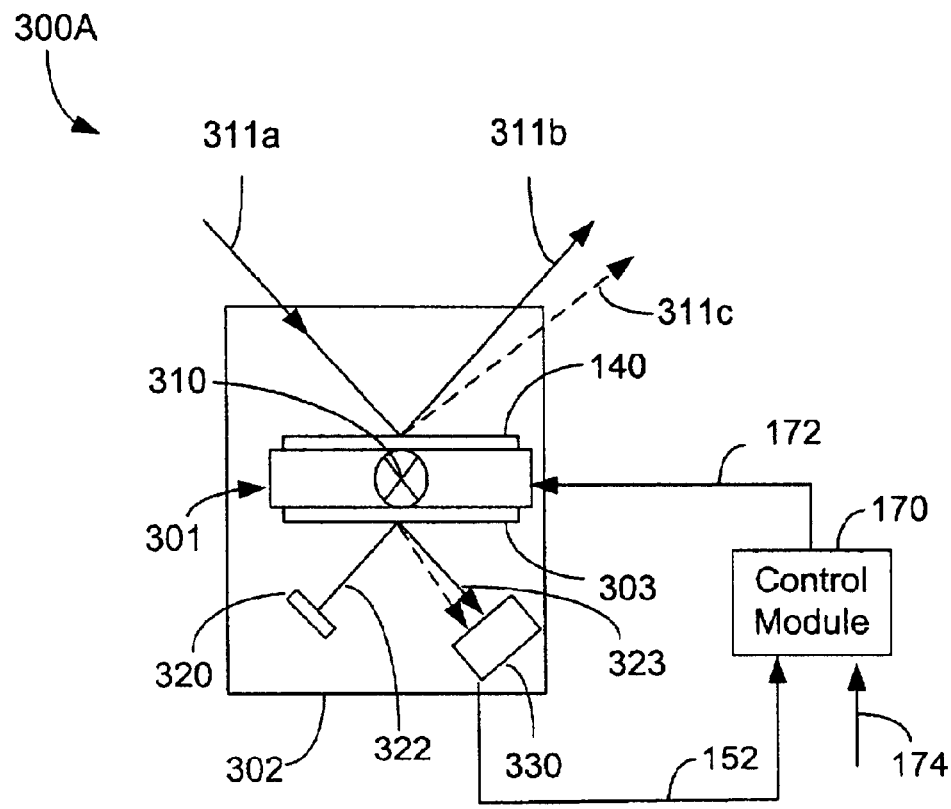
FIGS. 3A and 3B show two exemplary actively-controlled optical switches suitable for the systems in FIGS. 1 and 2.
Figure 3B:
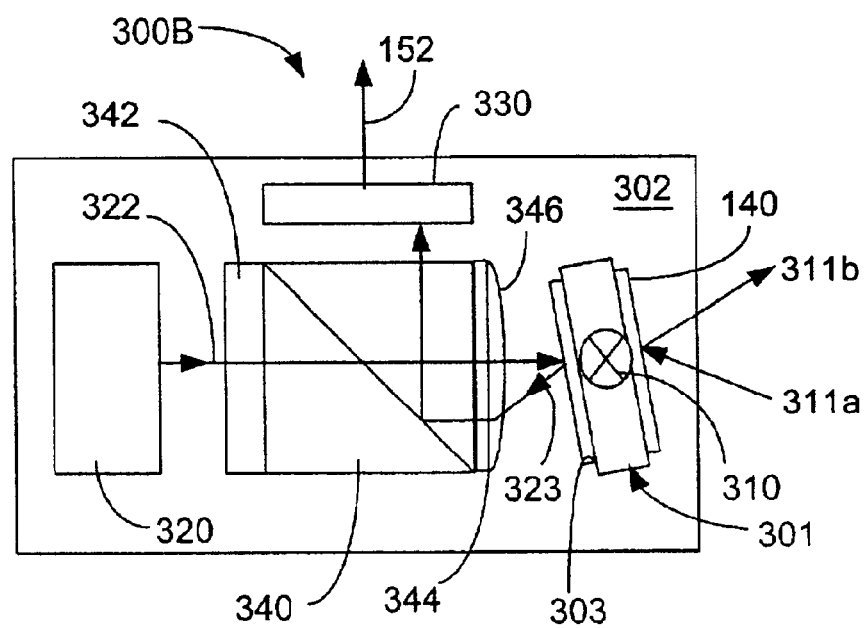

FIGS. 3A and 3B show two embodiments 300A and 300B of the actuator assembly 150 that has an actuator to rotate the reflector 140 and an integrated optical monitoring mechanism for measuring and monitoring the orientation of the reflector 140. The optical monitoring mechanism produces an output signal 152 that represents the measured orientation of the reflector 140. The control module 170 receives the signal 152 and adjusts the reflector 140 when the measured rotational position deviates from a desired position.

In the embodiment 300A, the reflector 140 is fixed to an actuator 301 to rotate with the actuator 301 around at least one rotational axis 310. The actuator 301 may be designed to rotate around two orthogonal axes if needed. Notably, a second reflector 303 that faces opposite to the reflector 140 is also fixed to the actuator 3901 to form a two-sided reflector assembly so that the reflector 303 is fixed relative to and rotates with the reflector 140. The rotational positions of the reflector 303, therefore, can be calibrated to represent the rotational positions of the reflector 140. The reflector 303 is used to receive a servo optical beam 322 from a servo light source 320 and to reflect it as a reflected servo beam 323 to an optical detector 330 which measures a position of the beam 323 on its detector surface. The servo optical beam 322 may have a servo wavelength different from those of the signal beams carried by the primary and backup fibers. A base 302 is provided to support the actuator 301 and the reflectors 140 and 303 engaged thereto, the servo light source 320 and the optical detector 330.

The rotational positions of the actuator 301 may be pre-calibrated so that the positions for directing the beam from the primary fiber into the detector 103 and for directing the beam from the backup fiber into the detector 103 are known. When the reflector 140 directs the input signal beam 311a to a direction 311c that deviates from a desired predetermined direction 311b based on the signal 152, the actuator 301 may be adjusted to correct the deviation and hence to adjust the reflected beam back to the proper direction 311b. Such operation is possible when the orientation of the reflector 140 can be monitored by measuring a direction change in a reflection of an optical servo beam 322 to detect the deviation.

The optical detector 330 may be a position-sensing photodetector to detect a position of the reflected servo beam 323. A LED or a diode laser may be used as the light source 320. The photodetector 330 may include a sensing surface operable to determine a position of the reflected monitor beam 323. For example, a detector with an array of discrete photosensing areas or pixels such as CCDs or quad detectors may be used. In addition, a semiconductor position sensitive detector with a PIN photodiode may be used. The PIN photodiode may include one or two uniform, resistive surfaces to provide continuous position data of a beam. The relative positions of the actuator 301, the light source 320, and the detector 330 are arranged and calibrated so that the positions of the reflected servo beam 323 on the detector 330 can be used to measure the orientations of the reflector 140. The output signal 152 of the detector 330 is fed to the control module 170 which processes the signal to extract the alignment error information. The control module 170 then generates a control signal 172 to control the orientation of the actuator 301 by, e.g., changing the driving current to a coil in the example of a galvanometer actuator, to reduce the alignment error. Therefore, the actuator 301, the detector 330, and the control module 170 collectively form an active feedback control loop.

The embodiment 300B in FIG. 3B uses a different optical arrangement in the optical sensing mechanism. A polarization beam splitter (PBS) 340, a quarter wave plate 344 as a polarization rotator, and a lens 346 are used to guide the incident polarized servo beam 322 and the reflected servo beam 323. The servo beam 322 is linearly polarized upon entering the PBS 340 so that it transmits through the PBS 340. An optical element 342 may be placed between the light source 320 and the PBS 340 to modify the output beam from the light source 320 so that the beam is linearly polarized along a proper direction and is well collimated. The lens 346 then directs the servo beam 322 onto the reflector 303. The reflected servo beam 323 passes through the lens 346 and the polarization rotator 344 for the second time so that its polarization is rotated by 90 degrees with respect to the original polarization. The PBS 640 then directs the reflected servo beam 323 to the photodetector 330 by reflection.

Figure 4:
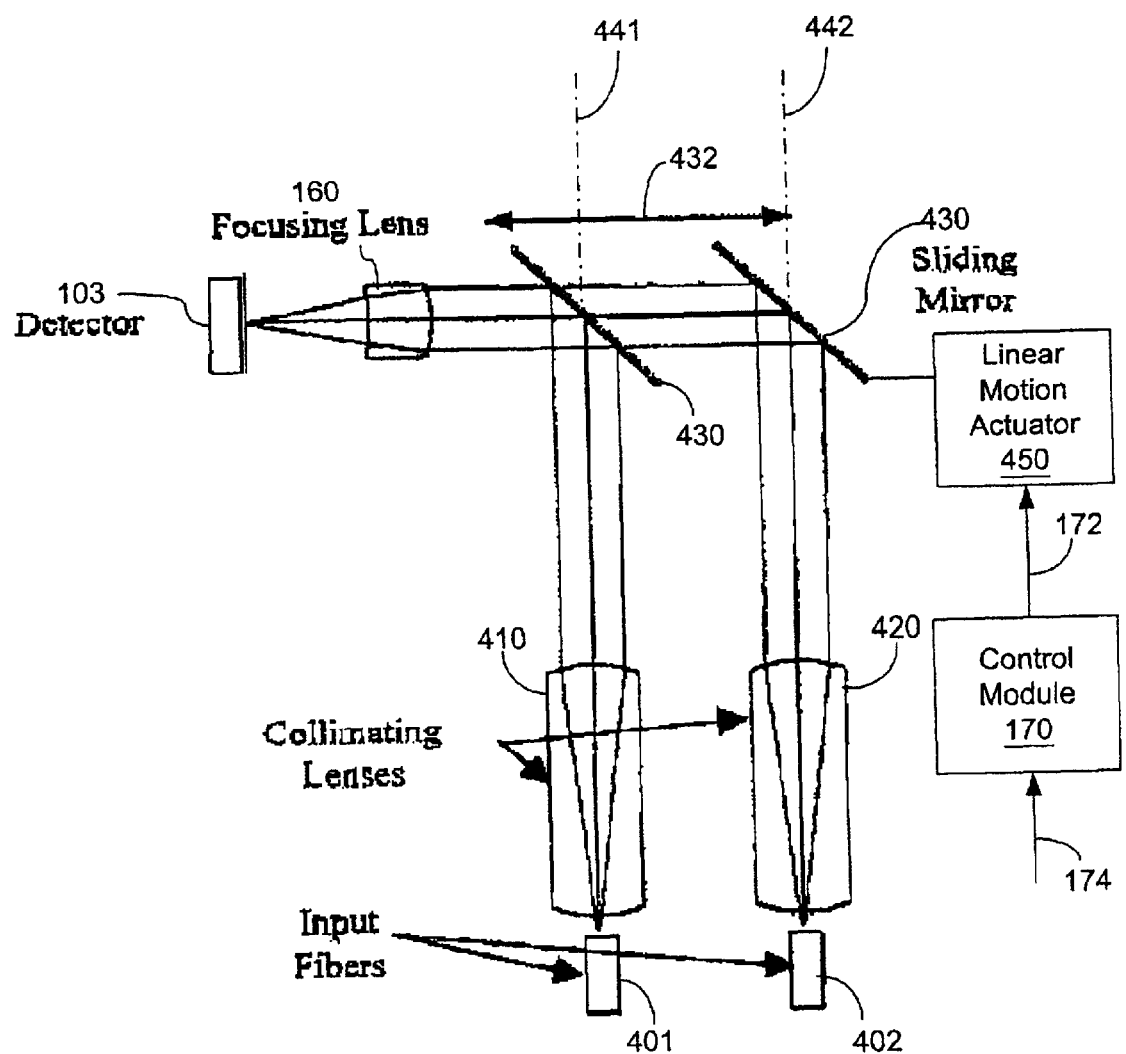
FIG. 4 shows another embodiment of a switchable two-fiber system based on a sliding reflector switch.

The optical switching mechanism may also be based on a linear movement of a reflector. FIG. 4 shows a switchable two-fiber system 400 that uses a sliding reflector 430 to switch the beams from the primary and backup fibers 401 and 402. The fibers 401 and 402 are substantially parallel to each other within an alignment tolerance range, e.g., about 1 milliradian. Two separate collimators 410 and 420 are used to respectively collimate the parallel beams out of the fibers 401 and 402. The reflector 430 is oriented to be at about 45 degrees with respect to the fibers 401 and 402 to reflect each beam to the signal detector 103 through the common focusing lens 160. A linear actuator 450 is engaged to the reflector 430 to move along the direction 432 that is substantially perpendicular to the longitudinal directions or the fiber optic axes of fibers 401 and 402. As illustrated, when the reflector 430 is set by the actuator 450 at a preset position 441, only the beam from the fiber 401 is received by the reflector 430 and is reflected to the lens 160 and the detector 103. At this position 441, the other beam from the fiber 402 is not directed to the detector 103. When the reflector 430 is set at a different preset position 442, only the beam from the fiber 402 is received by the reflector 430 and is reflected to the lens 160 and the detector 103. The other beam from the fiber 401 is not directed to the detector 103. In this system, the positional accuracy requirements for the reflector 430 are less stringent with respect to the rotational systems in FIGS. 1 and 2. Optical monitoring and active position control thus may be eliminated.

Only a few embodiments are disclosed. However, it is understood that variations and enhancements may be made without departing from the spirit of and are intended to be encompassed by the following claims.

What is claimed is:

1. A device, comprising:
   a first fiber to carry a first optical beam;
   a second fiber to carry a second optical beam;
   a reflector positioned to receive both said first and said second optical beams and rotatable to change reflected directions of said first and said second optical beams;
   a rotational actuator engaged to said reflector to control a rotational position of said reflector in response to a control signal;
   an optical detector positioned relative to said reflector to receive said first optical beam reflected from said reflector at a first rotational position and to receive said second optical beam reflected from said reflector at a second rotational position;
   a focusing lens positioned between said reflector and said optical detector to focus said first and said second optical beams; and
   a control module to produce said control signal in response to an input to switch said rotational actuator from said first rotational position to said second rotational position when said input indicates that said optical detector fails to receive said first optical beam from said first fiber.

2. The device as in claim 1, wherein said first and said second fibers form an angle toward each other and said device further comprising a first optical collimator lens positioned between said reflector and said first fiber to collimate said first optical beam and a second optical collimator lens positioned between said reflector and said second fiber to collimate said second optical beam.

3. The device as in claim 1, further comprising a common optical collimator lens positioned between said reflector and said first and said second fibers to receive and collimate both said first and said second optical beams.

4. The device as in claim 3, wherein said first and said second fibers are parallel to each other.

5. The device as in claim 1, further comprising an aperture located between said optical detector and said focusing lens to transmit light from said first fiber and block light from said second fiber when said rotational actuator is set in said first rotational position and to transmit light from said second fiber and block light from said first fiber when said rotational actuator is set in said second rotational position.

6. The device as in claim 1, wherein said actuator includes a galvanometer.

7. The device as in claim 1, wherein said actuator includes a MEMS actuator.

8. The device as in claim 1, wherein said actuator is an electrostatic actuator.

9. The device as in claim 1, wherein said actuator is a piezo-electric actuator.

10. The device as in claim 1, wherein said actuator is an electromagnetic actuator.

11. The device as in claim 1, further comprising a second reflector that is fixed relative to and rotates with said reflector, said second reflector having a reflective surface facing a direction opposite to a reflective surface of said reflector, the device further comprising:
    a monitor light source to produce a monitor beam incident onto said second reflector; and
    a monitor detector disposed relative to said second reflector to receive a reflection of said monitor beam off said second reflector to measure a position of said reflection on a detector surface of said monitor detector to determine a rotational position of said second reflector and hence a rotational position of said reflector,
    wherein said control module is coupled to receive a detector signal from said monitor detector to control said control signal to control an orientation of said reflector.

12. The device as in claim 11, wherein said monitor detector is a position-sensitive detector.

13. A device, comprising:
    a first fiber to carry a first optical beam;
    a second fiber positioned parallel to said first fiber to carry a second optical beam;
    an optical detector;
    a reflector oriented about 45 degrees with respect to said fibers and movably positioned at a first position to reflect said first optical beam into said optical detector while not receiving said second optical beam and at a second, different position to reflect said second optical beam into said optical detector while not receiving said first optical beam;
    an actuator engaged to said reflector to move said reflector between said first and said second positions in response to a control signal; and
    a control module to produce said control signal in response to an input to control said actuator to move said reflector from said first position to said second position along a direction perpendicular to said fibers when said input indicates that said optical detector fails to receive said first optical beam from said first fiber.

14. The device as in claim 13, further comprising a common focusing lens positioned between said reflector and said optical detector to focus light from said reflector to said optical detector.

15. The device as in claim 13, further comprising:
    a first optical collimator lens between said first fiber and said first position to collimate said first optical beam; and
    a second optical collimator lens between said second fiber and said second position to collimate said second optical beam.

16. A device, comprising:
    a first fiber to carry a first optical beam;
    a second fiber to carry a second optical beam;
    a reflector positioned to receive both said first and said second optical beams and rotatable to change reflected directions of said first and said second optical beams;
    an optical detector positioned relative to said reflector to receive said first optical beam reflected from said reflector at a first rotational position of said reflector and to receive said second optical beam reflected from said reflector at a second rotational position of said reflector;
    a rotational actuator engaged to said reflector to control a rotational position of said reflector in response to a control signal;

an optical monitoring mechanism to optically measure said rotational position of said reflector and to produce a monitor signal indicative of a measured rotational position; and a control module to produce said control signal in response to an input to switch said rotational actuator from said first rotational position to said second rotational position when said input indicates that said optical director fails to receive said first optical beam from said first fiber, said control module further coupled to receive said monitor signal form said optical monitoring mechanism to adjust said control signal for correcting a deviation of said reflector from a desired rotational position according to said monitor signal.

17. The device as in claim 16, wherein said optical monitoring mechanism comprises:

a second reflector that is fixed relative to and rotates with said reflector, said second reflector having a reflective surface facing a direction opposite to a reflective surface of said reflector, the device further comprising:

a monitor light source to produce a monitor beam incident onto said second reflector; and a monitor detector disposed relative to said second reflector to receive a reflection of said monitor beam off said second reflector to measure a position of said reflection on a detector surface of said monitor detector to determine a rotational position of said second reflector and hence a rotational position of said reflector.

18. The device as in claim 16, wherein said actuator includes an electromagnetic actuator.

19. The device as in claim 18, wherein said actuator includes a galvanometer.

20. The device as in claim 16, wherein said actuator includes an electrostatic actuator.

* * * * *